United States Patent
Lange et al.

(10) Patent No.: US 8,771,520 B2
(45) Date of Patent: Jul. 8, 2014

(54) FLUID TREATMENT APPARATUS

(75) Inventors: Neville Lange, Gloucester (GB);
Kenneth Wayne Severing, La Habra, CA (US)

(73) Assignee: VWS Westgarth Limited, Glasgow (GB)

( * ) Notice: Subject to any disclaimer, the term of this patent is extended or adjusted under 35 U.S.C. 154(b) by 1189 days.

(21) Appl. No.: 12/131,061

(22) Filed: May 31, 2008

(65) Prior Publication Data

US 2009/0294375 A1  Dec. 3, 2009

(51) Int. Cl.
*C02F 1/24* (2006.01)
*B01F 3/04* (2006.01)
*B03D 1/14* (2006.01)

(52) U.S. Cl.
USPC .. 210/703; 210/221.2; 261/23.1; 261/DIG. 75

(58) Field of Classification Search
USPC ............... 210/703; 261/23.1, DIG. 75
See application file for complete search history.

(56) References Cited

U.S. PATENT DOCUMENTS

| | | | |
|---|---|---|---|
| 1,311,919 A | 8/1919 | Seale et al. | |
| 1,312,898 A * | 8/1919 | Earhart | 261/116 |
| 1,342,103 A * | 6/1920 | Ehrhart | 261/23.1 |
| 1,380,665 A | 6/1921 | Lyster | |
| 2,342,024 A * | 2/1944 | Walker | 210/703 |
| 2,410,429 A | 11/1946 | Daman | |
| 3,647,069 A | 3/1972 | Bailey | |
| 3,707,067 A * | 12/1972 | Dietrick | 96/241 |
| 3,972,815 A | 8/1976 | O'Cheskey et al. | |
| 4,328,107 A | 5/1982 | Wright | |
| 4,406,782 A | 9/1983 | Hitland | |
| 4,464,309 A * | 8/1984 | Linhardt | 261/23.1 |
| 4,564,457 A | 1/1986 | Cairo, Jr. et al. | |
| 4,701,194 A * | 10/1987 | Weyers et al. | 96/242 |
| 4,986,903 A | 1/1991 | Canzoneri et al. | |
| 5,011,597 A | 4/1991 | Canzoneri et al. | |
| 5,227,061 A | 7/1993 | Bedsole | |
| 5,279,424 A * | 1/1994 | Britz et al. | 209/170 |
| 5,348,648 A | 9/1994 | Hamdan | |
| 5,465,848 A * | 11/1995 | Veh et al. | 209/170 |
| 6,220,578 B1 * | 4/2001 | Popov | 261/76 |
| 2004/0256325 A1 | 12/2004 | Frankiewicz et al. | |
| 2006/0213840 A1 | 9/2006 | Stacy et al. | |
| 2006/0249453 A1 | 11/2006 | Vogelpohl et al. | |

FOREIGN PATENT DOCUMENTS

| | | | |
|---|---|---|---|
| CH | 370057 | * | 6/1963 |
| DE | 26 38 428 A1 | | 3/1978 |
| DE | 3634903 A | * | 4/1988 |
| DE | 29808690 U1 | * | 8/1998 |
| DE | 19916192 C1 | * | 10/2000 |
| EP | 1 400 492 A2 | | 3/2004 |

(Continued)

*Primary Examiner* — Thomas M Lithgow
(74) *Attorney, Agent, or Firm* — Tarolli, Sundheim, Covell & Tummino LLP

(57) ABSTRACT

A fluid treatment apparatus comprises a fluid vessel defining first and second fluid chambers. A fluid inlet is provided for delivering a fluid to be treated into the first fluid chamber. One or more nozzle assemblies are provided for fluid communication between the first and second fluid chambers, wherein said nozzle assemblies are adapted to facilitate mixing of a gas with said fluid. The second fluid chamber is adapted to accommodate a fluid treatment process therein, including a floatation treatment. One specific use of the fluid treatment apparatus includes separating oil from water, particularly water produced from a subterranean formation.

29 Claims, 5 Drawing Sheets

(56) References Cited

FOREIGN PATENT DOCUMENTS

| | | | |
|---|---|---|---|
| JP | 04310286 A | * | 11/1992 |
| JP | 07047264 A | | 2/1995 |
| WO | WO 81/01700 A1 | * | 6/1981 |
| WO | 0025930 | | 5/2000 |
| WO | WO 02/41965 A2 | | 5/2002 |
| WO | WO-2004/112936 A1 | | 12/2004 |
| WO | WO 2005/030377 A1 | | 4/2005 |
| WO | WO 2006134235 A1 | * | 12/2006 |
| WO | WO 2007/141339 A1 | | 12/2007 |

* cited by examiner

FLUID TREATMENT APPARATUS

FIELD OF THE INVENTION

The present invention relates to a fluid treatment apparatus, and in particular, but not exclusively, to an apparatus for treating water produced from a subterranean hydrocarbon bearing formation. The present invention also relates to a method of treating a fluid.

BACKGROUND TO THE INVENTION

The fluids produced from subterranean reservoirs are typically a mixture of oil, water, gas, normally with a quantity of sand. In the early stages of production the fluids may be "dry", i.e., containing little or no water, but as production continues it is normal for greater quantities of water to be produced. In mature fields the proportion of water in the produced fluids can reach 90% and possibly around 95%. Reservoirs do not always produce large quantities of sand but when they do the sand production generally increases as the water production increases. The water produced from the reservoir is termed "produced water".

The produced water may be injected back into the formation or it may be discharged into the environment; for example, in off-shore production areas the water may be discharged into the sea. However, the produced water must be thoroughly treated in order to remove substantially all traces of oil and gas prior to being discharged into the environment in order to meet extremely strict environmental regulations.

In conventional production operations the produced fluid from the reservoir is initially treated to separate the saleable oil and gas from the un-saleable water and sand. However, the separated water will typically still contain unacceptable quantities of oil and gas and as such is normally subject to a secondary treatment to further reduce the concentration of hydrocarbons to acceptable levels for discharge to the environment or injection back into the formation.

A process known as "flotation" in commonly used to assist in the removal of oil and other contaminants from water. The principle of flotation is that bubbles of gas are introduced into (e.g., Induced Gas Floatation) or are established in (e.g., Dissolved Gas Floatation) a vessel containing a contaminated water, in which the bubbles will to a greater or lesser degree attach to the contaminants, such as oil droplets, and drag them to the surface of the water, leaving the bulk of the water depleted of contaminants, and the upper layers of the water enriched with contaminants. In subsequent discussions, each volume of water to which gas bubbles are added or are created to separate contaminants may be referred to as a "cell" or "flotation cell".

Flotation is usually operated as a continuous process, where there is a continuous inflow of contaminated water into the cell and a continual outflow of contaminant enriched water drawn from the surface layers of the cell and a continual outflow of the contaminant depleted water from the cell at a rate so as to maintain an essentially constant level in the vessel.

It is usual for the contaminants floated to the surface of the water to be retained in a froth which is either formed naturally when the contaminants are present at the higher concentrations found at the water surface, or with the assistance of chemicals which are added to the inflowing liquid. Buoyant contaminants, for example droplets of oil, may not need to be frothed to keep them at the surface.

The contaminants on the water surface may be removed by a variety of means, the two most common being weirs set slightly below the water surface so that the contaminant enriched surface layer preferentially flows over them, or paddles which sweep the contaminant enriched surface layer over a weir which is normally set slightly above the water surface. A number of designs of floating skimming devices are also known which have the advantage that they can tolerate a wider variation in operating liquid level than either of the aforementioned fixed weir methods can accommodate.

In Induced Gas Floatation (IGF) methods, gas bubbles are typically added to the contaminated water by eductors or mechanical mixers. An IGF cell must be mixed to bring the gas bubbles into intimate contact with the contaminants, such as oil droplets, so that they can be separated by them, but this mixing has the side effects of making it more difficult for the bubbles to rise to the surface, and causing variation in the residence time of parcels of water within the cell. While the average residence time in the cell can be determined by the volume of the cell and the water flowrate, the mixing can mean that some parcels of water pass through the cell in a much shorter time than is required for good separation, and conversely some parcels of water may reside in the cell much longer than the average residence time.

The necessity to have mixing in the cell to contact the gas bubbles and contaminants reduces the efficiency of separation in the cell. For this reason IGF vessels are commonly horizontal vessels which contain a plurality of IGF cells in series, typically four, so that the overall efficiency of the separation is increased. Examples of known IGF systems of this type are shown in U.S. Pat. No. 4,564,457, US 2006/0213840, U.S. Pat. Nos. 3,972,815, 3,647,069 and 5,348,648.

Nevertheless, in some applications vertical single stage cell flotation units are known, which have a single IGF cell which typically has a cell volume, and hence residence time, somewhat larger than would be found in the four cells of a tyicall horizontal IGF unit. Examples of such IGF arrangements are shown in WO 2004/112936 and U.S. Pat. No. 5,011,597.

It is understood that an IGF unit requires the fluid to reside within the vessel for a period sufficient to allow floatation of the oil and separation of the gas. However, increasing residence time will directly reduce the maximum fluid treatment rate which can be achieved. It may be possible to address this issue by increasing the size of the IGF unit but this is not desired due to the restricted available space in conventional production environments.

It is desirable to reduce the space occupied by, and weight of, equipment installed on offshore platforms, and for this reason compact floatation units have been proposed in the art for treating produced water with minimal plant footprint. For example, prior art reference WO 02/41965 discloses a vertically arranged vessel which receives fluid to be treated via a tangentially arranged fluid inlet. Arranging the fluid inlet in this manner establishes rotation of the fluid within the vessel which is alleged to assist coalescence of oil and gas bubbles and floatation to the surface. The vessel may incorporate a spiralling guide vane to enhance fluid rotation.

In WO 02/41965 the vessel is operated at a low pressure to permit dissolved gas to evolve from the water phase and create gas bubbles in the zone adjacent the fluid inlet to mimic the effect of IGF units. However, if an insufficient volume of gas is present in the fluid then additional gas may be added to the fluid.

Prior art reference EP 1 400 492 also discloses a compact floatation unit which comprises a vertically arranged vessel with one or more tangential fluid inlets to encourage fluid rotation. In EP 1 400 492 the vessel also includes tangentially arranged fluid/sparge gas inlets. These inlets communicate gassified water into the vessel.

Other techniques for treating fluids by the use of gas bubbles include cascade floatation techniques, in which fluid to be treated is passed through eductors into containers, in a cascading fashion. Examples of such techniques are disclosed in U.S. Pat. Nos. 1,311,919, 1,380,665 and 4,406,782.

It is among objects of the present invention to obviate or mitigate one or more problems in the prior art.

SUMMARY OF THE INVENTION

According to a first aspect of the present invention there is provided a fluid treatment apparatus comprising:
a fluid vessel;
first and second fluid chambers defined within the fluid vessel;
a fluid inlet for delivering a fluid to be treated into the first fluid chamber; and
at least one nozzle assembly for providing fluid communication between the first and second fluid chambers, wherein said nozzle assembly is adapted to facilitate mixing of a gas with said fluid.

The at least one nozzle assembly may facilitate entrainment of a gas into said fluid. Alternatively, or additionally, the at least one nozzle assembly may facilitate injection, commingling or delivery of a gas into said fluid. However, for brevity of the present summary of the invention, the general concept of mixing gas with or delivery of a gas into the fluid being treated shall generally be referred to as entrainment.

The apparatus may be adapted to treat a fluid containing multiple components, which components may comprise any one or a combination of liquids, gases and solids. For example, the fluid may comprise a water/oil mixture, water/oil/gas mixture or the like.

The first fluid chamber may be adapted to receive the fluid to be treated and distribute this fluid into the second fluid chamber, with entrained gas, to be treated therein. The first fluid chamber may therefore define a distribution chamber and the second chamber may define a treatment chamber.

The second fluid chamber may be adapted to accommodate a separation treatment of the fluid therein. The separation treatment may be adapted to effect separation of components of the fluid, such as components of different densities, chemistries, phases or the like. Advantageously, the gas entrained into the fluid entering the second chamber may enhance fluid separation. The separation treatment may comprise a floatation separation treatment.

In one embodiment the second fluid chamber may be adapted to accommodate a separation treatment to effect the separation of mineral oil and optionally gas from water, such as water produced from a subterranean hydrocarbon reservoir. In this arrangement the entrainment of gas into the fluid communicated from the first fluid chamber may assist floatation of the oil. The oil may be skimmed or otherwise collected from the surface of the water within the second fluid chamber. Additionally, gas released from the water may be collected.

Advantageously, providing the at least one nozzle assembly to facilitate entrainment of gas into the fluid being treated may eliminate the requirement to provide external plant equipment, such as gassifiers, mixers, pumps, compressors and the like, associated with prior art arrangements. However, in embodiments of the present invention it may be desirable to utilise such external or additional equipment. Furthermore, the at least one nozzle assembly is adapted to communicate fluid which has already been mixed with a gas into the second fluid chamber. Thus, the residence time of the fluid within the second chamber may be used substantially entirely for treatment of the fluid, such as separation of components of the fluid. This therefore differs from prior art arrangements in which the residence time must also accommodate sufficient gas/fluid mixing.

The fluid vessel may be arranged vertically. This arrangement may assist to minimise the footprint of the fluid treatment apparatus which is advantageous, particularly in offshore applications. Alternatively, the fluid vessel may be arranged horizontally. Alternatively further, the fluid vessel may be arranged to incline.

The first and second fluid chambers may be arranged to be adjacent each other within the vessel. Alternatively, the first and second chambers may be separately arranged within the vessel. The first and second fluid chambers may be vertically arranged within the vessel. That is, one chamber may be at least partially arranged above the other chamber. In one embodiment the first chamber may be at least partially arranged above a portion of the second chamber. This may facilitate a gravity feed of fluid between the chambers.

Alternatively, or additionally, the first and second chambers may be horizontally arranged within the vessel. That is, one chamber may be at least partially arranged beside the other chamber.

The apparatus may comprise a partition adapted to at least partially separate the first and second fluid chambers. The partition may divide the vessel into at least the first and second fluid chambers. The partition may comprise a plate or the like, and may be of any suitable shape, such as generally circular, annular, square, rectangular or the like. The partition may be secured to an inner surface of the vessel, for example by welding, a flanged connection, bolting, interference fitting or the like, or any suitable combination thereof. The partition may be formed as a single component, or may be formed of multiple components.

The partition may define a wall portion or boundary of one or both of the first and second chambers. The partition may define a base of one or both chambers. The partition may define an upper region or ceiling of one or both chambers. In one embodiment of the present invention the partition may define a base of the first chamber and a ceiling of the second chamber.

The at least one nozzle assembly may be adapted to extend through the partition. The at least one nozzle assembly may be secured to the partition such that the partition provides support for the at least one nozzle assembly.

The at least one nozzle assembly may comprise a first fluid conduit defining a fluid port adapted to permit communication of fluid to be treated from the first fluid chamber into the first fluid conduit. The fluid port may be provided in the base region of the first fluid chamber. Alternatively, the fluid port may be provided at a raised location relative to a base region of the first fluid chamber. In this arrangement the raised location of the fluid port may permit the nozzle assembly to be operational only when a predefined head of fluid to be treated is present in the first fluid chamber. This arrangement may assist to permit a preferential flow velocity and flow range between the first and second chambers to be achieved. The first fluid conduit may be entirely contained within the vessel. Alternatively, at least a portion of the first fluid conduit may extend externally of the vessel.

The at least one nozzle assembly may comprise a second fluid conduit adapted to permit fluid communication of a gas from a gas source to a portion of the nozzle assembly. In this way, gas from the gas source may be entrained into the fluid being treated.

The gas source may comprise gas contained within the vessel, and may comprise gas contained within one or both of the first and second fluid chambers. In this arrangement the second fluid conduit may define a fluid port open to a gas filled region of one or both of the first and second fluid chambers. The gas may comprise gas released from the fluid being treated. Alternatively, the gas may comprise gas provided from an external source.

The second fluid conduit may be directly coupled to an external gas source.

The second fluid conduit may be entirely contained within the vessel. Alternatively, at least a portion of the second fluid conduit may extend externally of the vessel.

The at least one nozzle assembly may comprise a discharge pipe in fluid communication with one or both the first and second fluid conduits. At least a portion of the discharge pipe may facilitate mixing or commingling of fluid delivered via the first fluid conduit with gas delivered via the second fluid conduit. In this arrangement, turbulence and mixing in the discharge pipe may configure the gas into small bubbles and cause these bubbles to intimately mix with the fluid from the first chamber. Accordingly, the nozzle assembly may deliver a fluid into the second chamber which contains a favourable distribution of gas bubbles for subsequent fluid treatment in the second chamber.

The discharge pipe may define a fluid outlet opening into the second fluid chamber to permit the gas and fluid mixture to be discharged into said second chamber. The fluid outlet of the discharge pipe may be adapted to be at least partially submerged within the fluid being treated within the second fluid chamber.

The discharge pipe may be arranged to discharge fluid into any region of the second chamber. In one embodiment, the discharge pipe may be arranged to discharge fluid into an outer region of the second chamber.

The discharge pipe may be oriented to permit the fluid and gas mixture to be discharged into the second chamber in a predetermined direction. This arrangement may assist to establish a preferred fluid motion within the second fluid chamber. In one embodiment the discharge pipe may be arranged to establish rotational flow within the second chamber. Rotational flow may be established relative to a central axis of the second chamber. Rotational flow within the second fluid chamber may assist fluid treatment therein. For example, the rotating flow may assist preferential movement of gas bubbles within the fluid being treated, preferential motion of components of the fluid to discharge regions of the second chamber and the like. The rotating flow may suppress forward mixing of the treated fluid towards an outlet (i.e., premature discharge of the fluid being treated), and may modify the residence time distribution.

The discharge pipe may be obliquely (i.e., non-parallel) arranged relative to a central axis of the second chamber. The discharge pipe may be obliquely arranged to discharge fluid into an outer region of the second chamber, advantageously to initiate rotational flow within said second chamber. The discharge pipe may be adapted to discharge fluid with a first velocity component which is parallel to a central axis of the second fluid chamber, and a second velocity component which is perpendicular to the central axis (i.e., tangential to a circle with an origin coinciding with the vessel central axis).

The apparatus may comprise a plurality of nozzle assemblies. At least one of the plurality of nozzle assemblies may be similar to the at least one nozzle assembly described above.

The nozzle assemblies may be arranged in an annular configuration relative to the first fluid chamber. However, other configurations may be utilised. For example, the nozzle assemblies may be arranged to generally conform to the outer peripheral shape of the vessel, which may be other than circular.

Each nozzle assembly may be adapted to be operational at substantially the same fluid head range within the first fluid chamber. For example, each nozzle assembly may comprise a fluid port adapted to permit communication with fluid contained within the first fluid chamber, wherein the fluid ports may be arranged at substantially the same height relative to a base region of the first fluid chamber. Accordingly, when the head, i.e., fluid level, within the first fluid chamber drops below the level of the fluid ports, all of the nozzle assemblies will be rendered ineffective, until a sufficient head is re-established.

Alternatively, at least one of the plurality of nozzle assemblies may be adapted to be operational at a different head of fluid within the first fluid chamber than at least one other of the plurality of nozzle assemblies. For example, at least two of the nozzle assemblies may comprise respective fluid ports adapted to permit communication with fluid contained within the first fluid chamber, wherein the fluid ports may be arranged at different respective heights relative to a base region of the first fluid chamber. Accordingly, in this arrangement, if the fluid head within the first fluid chamber begins to drop, for example as a result of a reduced flow rate through the inlet, the nozzle assemblies will sequentially be rendered ineffective in accordance with the heights of the respective fluid ports. This arrangement may therefore be utilised to maintain a preferred velocity range of the fluid entering the second fluid chamber through the nozzle assemblies. The preferred velocity range may be selected in accordance with the required flow within the second fluid chamber. In this arrangement, providing a degree of control over the velocity range may assist to maintain a preferential flow pattern (e.g., rotational) in the second chamber, reducing the effect of variations in the flow through the inlet to the first chamber.

The preferred velocity range may also be selected to maintain the proportion of gas entrained within the fluid and the mixing between them which occurs in the discharge pipe within predefined values.

A fluid passage may be provided between the first and second chambers to permit fluid communication therebetween, preferably in both directions. The fluid passage may be contained within the vessel. Alternatively, or additionally, a portion of the fluid passage may extend externally of the vessel. The fluid passage may be adapted to permit fluid communication of a gas between the first and second chambers. In one embodiment the fluid passage may be adapted to permit fluid communication of a gas from the second fluid chamber into the first fluid chamber. The gas may comprise gas released from a fluid being treated within the second chamber. Alternatively, or additionally, the gas may comprise a gas supplied from an external source. The fluid passage may alternatively, or additionally, be adapted to communicate a liquid or solids or the like between the first and second fluid chambers.

The fluid passage may be provided centrally or eccentrically of the vessel. A single fluid passage may be provided, or a plurality of fluid passages may be provided. The fluid passage may extend through a partition separating the first and second chambers. The fluid passage may be defined by a wall extending from a surface of the partition. In this arrangement the wall may define an annular region with the inner wall surface of the first fluid chamber, wherein said annular region is adapted to receive fluid to be treated from the vessel fluid inlet. The at least one nozzle assembly may be positioned within the annular region.

The first fluid chamber may comprise a distributor assembly adapted to receive fluid entering the first chamber via the fluid inlet. The distributor assembly may be adapted to dissipate the momentum of the incoming fluid. The distributor assembly may be adapted to distribute the fluid towards the at least one nozzle assembly while minimising turbulence. The distributor assembly may comprise a box-shaped structure adapted to receive fluid from the fluid inlet. The box-shaped structure may comprise a perforated region permitting communication of fluid from said structure.

The apparatus may comprise one or more fluid outlets to permit discharge of treated fluid or components thereof from the vessel. The fluid outlets may be provided within one or both of the first and second fluid chambers. In one embodiment the apparatus may comprise a first fluid outlet adapted to permit discharge predominantly of a first fluid component, such as a liquid, for example water. The first fluid outlet may be positioned within the second chamber, and may be positioned within a lower region of the second chamber.

The apparatus may further comprise a second fluid outlet adapted to permit discharge predominantly of a second fluid component, such as a liquid, for example oil. The second fluid outlet may be positioned within the second fluid chamber, and may be positioned within an upper region of the second chamber.

The apparatus may further comprise a third fluid outlet adapted to permit discharge predominately of a third fluid component, such as a gas, for example hydrocarbon gas. The third fluid outlet may be positioned within the first fluid chamber, and may be positioned within an upper region of the first chamber.

At least one fluid outlet may comprise an arrangement adapted to substantially eliminate or at least minimise vortex flow therethrough.

The apparatus may further comprise a skimming apparatus adapted to skim a component of the fluid being treated from a surface thereof. The skimmed component may comprise oil. A conventional skimming apparatus may be utilised.

The second fluid chamber may be adapted to receive fluid only from the first fluid chamber. Accordingly, in this arrangement the entire volume of fluid to be treated flows through the first fluid chamber. Alternatively, the second fluid chamber may be adapted to receive fluid from another source.

Communication of fluid being treated between the first and second fluid chambers may be achieved exclusively through the at least one nozzle assembly. Alternatively, fluid communication may be additionally achieved by other means.

The at least one nozzle assembly may permit the addition of a fluid treatment agent into the fluid being treated. For example, the fluid treatment agent may comprise a pH neutraliser, flocculent or the like.

The at least one nozzle assembly may comprise an eductor.

This vessel may comprise a single vessel containing both the first and second fluid chambers. The vessel may comprise a closed vessel. Alternatively, the vessel may comprise an opened vessel, for example open top, such that at least a portion of the vessel may be exposed to ambient atmosphere.

The apparatus may comprise a third fluid chamber adapted to receive fluid from the second fluid chamber for further treatment. Fluid communicated from the second fluid chamber into the third fluid chamber may be provided via at least one nozzle assembly.

According to a second aspect of the present invention there is provided a method of treating a fluid, said method comprising the steps of:
delivering a fluid to be treated into a first fluid chamber;
flowing the fluid through at least one nozzle assembly adapted to mix gas with said fluid; and
discharging the fluid from the at least one nozzle assembly into a second fluid chamber to be further treated therein.

The fluid may be treated within the second chamber and subsequently discharged, wherein the mixing of the gas with the fluid in the at least one nozzle facilitates or assists the subsequent treatment within the second fluid chamber. A floatation treatment may be provided in the second fluid chamber.

The apparatus utilised to perform the method may be provided in accordance with that apparatus of the first aspect, and the method of operating said apparatus should be understood to apply to the method according to the present aspect of the invention.

According to a third aspect of the present invention there is provided a fluid treatment apparatus comprising:
a first fluid chamber;
a second fluid chamber;
a fluid inlet for delivering a fluid to be treated into the first fluid chamber; and
at least one nozzle assembly extending between the first and second fluid chambers for providing fluid communication therebetween, wherein said nozzle assembly is adapted to facilitate mixing of a gas with said fluid.

The first and second fluid chambers may be provided in a single vessel. The vessel may be closed or alternatively may be open to atmosphere. Alternatively, the first and second fluid chambers may be defined in separate vessels. At least one of the vessels may be closed. At least one of the vessels may be open to atmosphere.

According to a fourth aspect of the present invention there is provided a fluid treatment apparatus comprising:
a fluid treatment vessel adapted to receive a fluid to be treated from a fluid source; and
at least one nozzle assembly provided between the fluid treatment vessel and the fluid source, wherein the fluid from the fluid source is adapted to flow through the at least one nozzle assembly prior to entering the fluid treatment vessel, and wherein the at least one nozzle assembly is adapted to mix a gas with the fluid.

Accordingly, the entire volume of fluid is mixed with gas prior to entering the fluid treatment vessel. Thus, the residence time of the fluid within the fluid treatment vessel may be entirely used for treating of the fluid. This differs from prior art arrangements in which gas mixing is performed within the fluid treatment vessel.

According to a fifth aspect of the present invention there is provided a nozzle arrangement for distributing a fluid to be treated between a first fluid chamber and a second fluid chamber, said nozzle arrangement comprising:
a first nozzle assembly comprising a first fluid conduit extending between the first and second fluid chambers, wherein the first fluid conduit comprises a first fluid port providing communication with the first fluid chamber; and
a second nozzle assembly comprising a second fluid conduit extending between the first and second fluid chambers, wherein the second fluid conduit comprises a second fluid port providing communication with the first fluid chamber;
wherein the first and second fluid ports are provided a different heights relative to a base of the first fluid chamber to facilitate operation of the first and second nozzle assemblies with different head ranges of fluid within said first fluid chamber.

This arrangement may therefore permit a preferred velocity range of fluid distributed into the second fluid chamber, irrespective of the flow rate of liquid into the first fluid chamber.

It should be understood that although different aspect of the invention have been presented, features presented in relation to one aspect may be applied to one or more other aspects.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
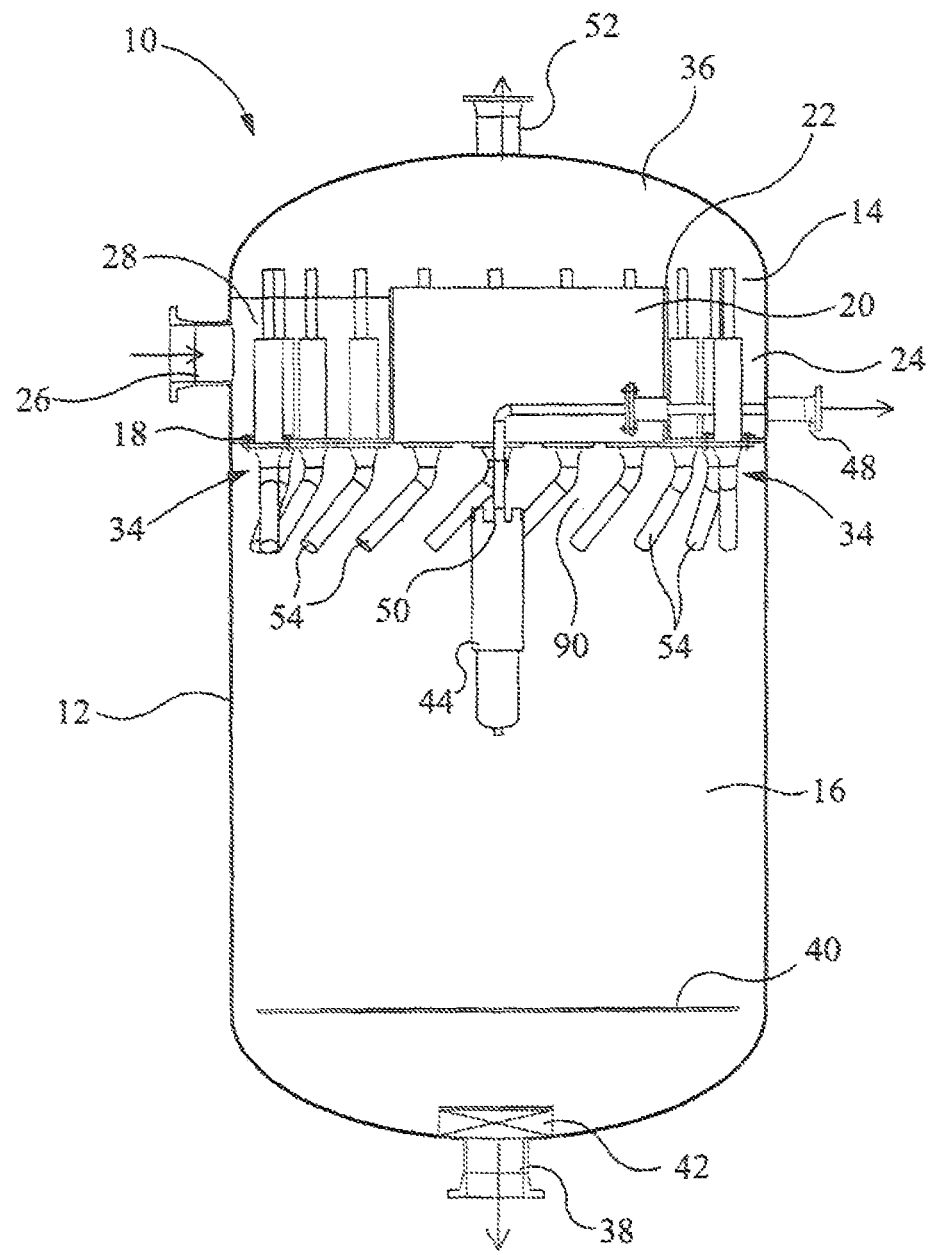
FIG. 1 is a longitudinal cross-sectional view of a fluid treatment apparatus in accordance with an embodiment of the present invention.
Figure 2:
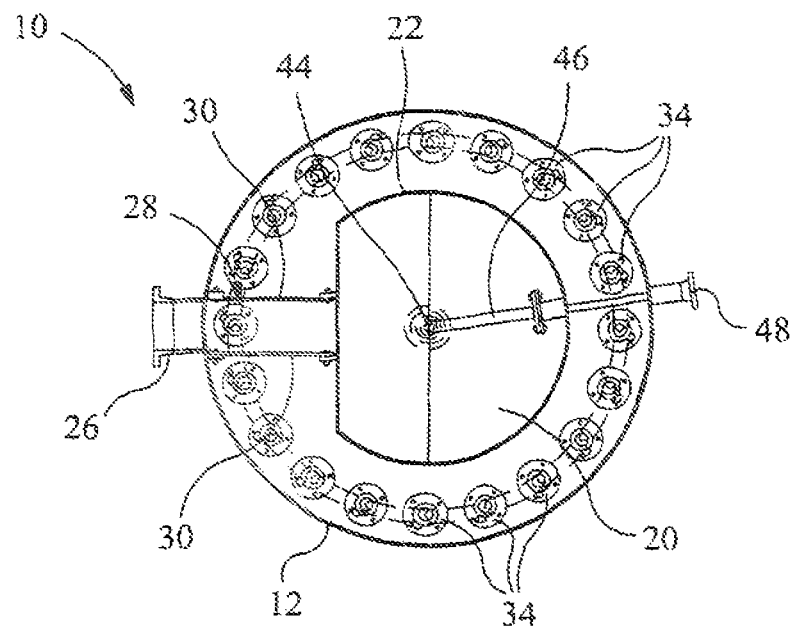
FIG. 2 is a lateral cross sectional view of the apparatus in the region of an upper chamber.

Reference is first made to FIGS. 1 and 2 of the drawings in which there is shown cross-sectional views of a fluid treatment apparatus, generally identified by reference numeral 10, in accordance with an embodiment of the present invention. The apparatus 10 is shown in FIG. 1 in longitudinal cross-section, and in FIG. 2 in lateral cross-section. The fluid treatment apparatus 10 may be used in many applications. However, in the present embodiment the apparatus 10 is utilised to treat water produced from a subterranean reservoir which comprises quantities of oil and gas. As will be described in further detail below, the apparatus 10 is adapted to separate the oil and gas from the produced water by floatation separation. The apparatus 10 may therefore be described as a Compact Floatation Unit (CFU).

The apparatus 10 comprises a vertically arranged generally cylindrical vessel 12 which defines therein a first or upper fluid chamber 14 and a second or lower fluid chamber 16. The upper and lower fluid chambers are separated by a partition 18 secured to an inner wall surface of the vessel 12. The partition defines a base of the upper chamber 14 and a ceiling of the lower chamber 16.

A fluid passage 20 extends between the upper and lower chambers 14, 16 and is defined by a wall portion 22 upstanding from the partition 18. The wall portion 22 in combination with the inner wall surface of the vessel 12 defines a generally annular region or channel 24 within the upper chamber 14. As will be described in further detail below, the fluid passage 20 permits communication of gas between the upper and lower chambers 14, 16.

Figure 3:
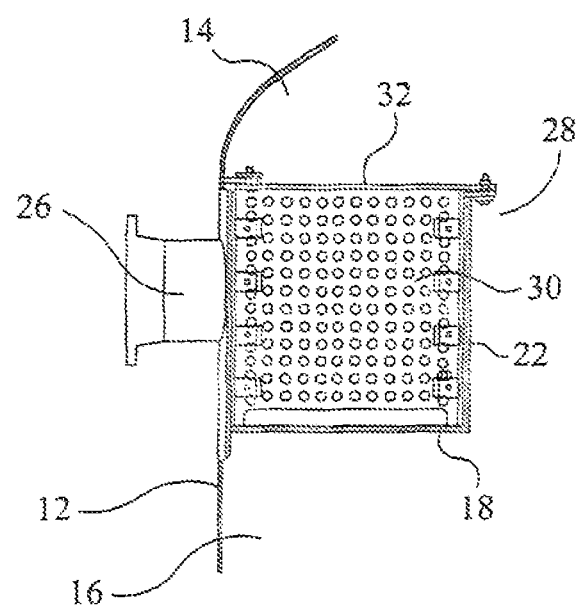
FIG. 3 is an enlarged view of an inlet region of the apparatus first shown in FIG. 1.

A fluid inlet 26 is formed in a side wall of the vessel 12 and in use communicates produced water to be treated into the upper fluid chamber 14, and specifically into the annular region 24. A distributor assembly 28 is provided within the upper chamber 14 and is arranged to initially receive the produced water entering via the inlet 26. The distributor assembly 28, which is most clearly shown in FIG. 2 and in the enlarged view in FIG. 3, is in the form of a box defined by the partition 18, the wall portion 22, an inner wall portion of the vessel 12, perforated side plates 30 and a solid lid 32 (shown only in FIG. 3). Thus, produced water entering the upper chamber 14 via the inlet 26 will be first received into the distributor assembly 28 and then distributed into the annular region 24 through the perforated side plates 30. The distributor assembly 28 functions to dissipate the momentum of the incoming produced water and to distribute this into the annular region 24 with minimum turbulence, preventing or minimising the risk of inadvertent splashing or leakage of the water into the lower chamber 16 through the passage 20.

The apparatus 10 further comprises a plurality of nozzle assemblies or eductors 34 which provide fluid communication of the produced water from the annular region 24 of the upper chamber 14 into the lower chamber 16. Thus, the upper chamber 14 receives produced water via the fluid inlet 26, and subsequently distributes this into the lower chamber 16 through the nozzle assemblies 34. The produced water is then subject to a flotation treatment within the lower chamber 16. Accordingly, the upper fluid chamber 14 may define a distribution chamber and the lower fluid chamber 16 may define a treatment chamber.

Each nozzle assembly 34 facilitates entrainment of a gas into the produced water flowing therethrough. The gas is entrained from a header region 36 of the upper chamber 14 and turbulence and mixing within each nozzle assembly 34 configures the entrained gas into small bubbles and causes these to intimately mix with the produced water before being discharged into the lower chamber 16. Thus, the nozzle assemblies 34 deliver the produced water into the lower chamber 16 with a favourable distribution of gas bubbles for subsequent fluid treatment therein. This is particularly advantageous in that the subsequent residence time of the water within the lower chamber 16 may be utilised exclusively for the floatation treatment and separation of the oil and gas from the water. This significantly differs from prior art arrangements in which the mixing of gas takes place within a floatation chamber and thus the residence time must accommodate both gas mixing and floatation separation.

The form of the nozzle assemblies 34 will be described in further detail below.

Once the produced water enters the lower chamber 16, the water and oil will naturally begin to separate with the oil tending to float to the surface of the water. The presence of well distributed gas bubbles within the produced water augments this separation effect in that the bubbles adhere to oil droplets within the water and assist coalescence and floatation of the oil. Upon reaching the surface of the water the gas bubbles will be released into an upper region 90 of the lower chamber 16, and will subsequently flow into the header region 36 of the upper chamber 14 through the passage 20. Accordingly, gas released form the produced water may replenish the header region 36 to maintain a sufficient volume of gas for entrainment into incoming produced water by the nozzle assemblies 34.

The apparatus 10 further comprises a first outlet 38 formed in a lower region of the lower chamber 16 and adapted to facilitate discharge of treated water. A baffle 40 and vortex breaker 42 are also present within the lower region of the lower chamber 16 and are adapted to prevent gas bubbles from being discharged through the first outlet 38 with the treated water. As shown in FIG. 1, the baffle 40 is positioned concentrically of the vessel 12 and has a diameter which may be approximately 80 to 95% of the inner diameter of the vessel 12.

A skimming apparatus 44 is provided in an upper region of the lower chamber 16 and is adapted to skim oil from the surface of the water. The skimmed oil is discharged through a pipe 46 and ultimately through a second outlet 48 formed in a side of the vessel 12 above the location of the partition 18. The vessel 12 is advantageously maintained at a pressure slightly above atmospheric to drive the skimmed oil upwardly through the pipe 46 towards the second outlet 48. The oil may then be collected and processed as required.

The skimming apparatus 44 is self levelling such that an upper skimming region 50 is maintained at a predefined position relative to the surface of the water/oil within the lower chamber 16 to preserve efficient skimming of the oil.

A third outlet 52 is provided in the upper region of the upper chamber 14 and permits gas within the header region 36 to be discharged from the vessel 12. The gas may be collected, flared, recycled or the like. The outlet 52 may also function as an inlet to permit gas to be supplied into the vessel 12.

In the present embodiment the nozzle assemblies 34 comprise discharge pipes 54 which are partially immersed within the produced water in the lower chamber 16 and are arranged in a common direction to discharge the produced water downwardly and circumferentially relative to the vessel 12. This arrangement effects rotation of the water within the lower chamber 16 which advantageously assists fluid treatment therein and provides preferential movement of gas bubbles within the fluid and floating oil towards the skimming assembly 44. Also, the rotation of the produced water assists to suppress water from passing through the lower chamber 16 without allowing sufficient time for the gas bubbles and oil droplets to separate from the water.

Figure 4:
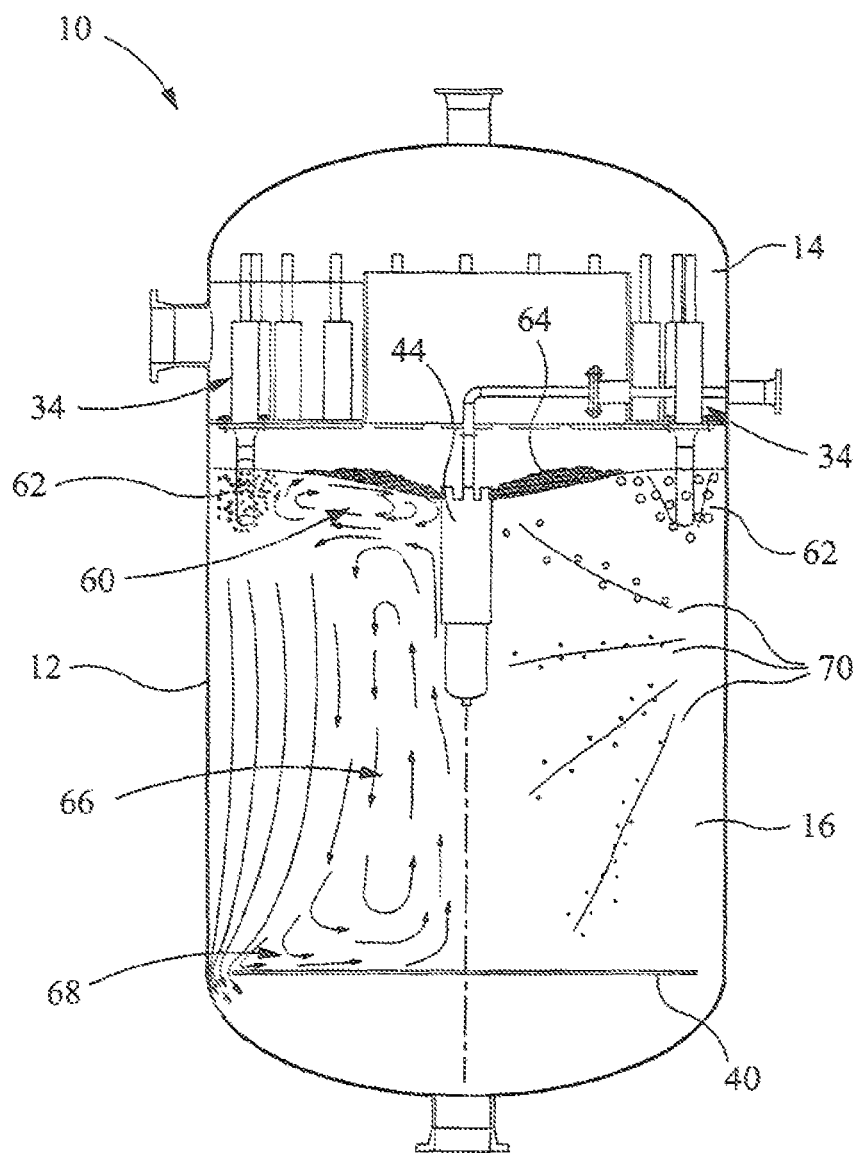
FIG. 4 is a diagrammatic representation of anticipated flow patterns within the apparatus of FIG. 1.

Reference is now made to FIG. 4 of the drawings in which there is shown a diagrammatic representation of an anticipated flow pattern within the vessel 12. The left hand side of the vessel 12 shown in FIG. 2 illustrates an anticipated water secondary flow pattern, and the right hand side shows the anticipated bubble trajectories within the lower chamber 16. It should be understood that the primary rotational motion of the fluid about the central longitudinal axis of the vessel 12 is not represented in FIG. 4 for clarity.

A lateral circulation loop 60 (loop 1) is driven by the gas lift of the large bubbles 62 discharged from the nozzle assemblies 34 rapidly rising to the surface. Circulation loop 60 makes sure the flow on the liquid surface is towards the skimming assembly 44, so that separated oil 64 may be carried in this direction. A longitudinal circulation loop 66 (loop 2) is driven by radially inward flow in the liquid boundary layer 68 on the baffle 40. Circulation loop 66 captures the small gas bubbles 70 which have downward trajectories out of the main water flow and carries these towards the centre and then upwardly towards the surface, to be captured by circulation loop 60. The small gas bubbles 70 must therefore cross into circulation loop 60 to finally reach the surface, and/or coalesce into larger bubbles.

Figure 5:
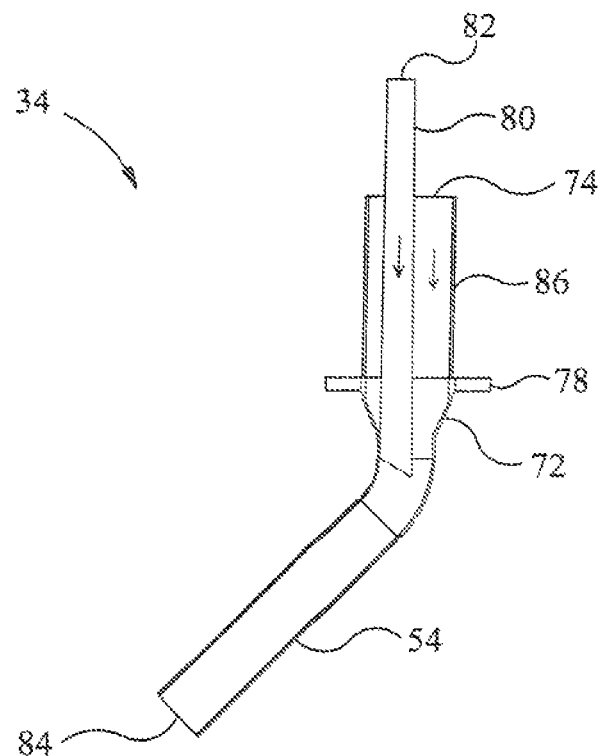
FIG. 5 is a cross-sectional view of a nozzle assembly according to one embodiment of the present invention, which is suitable for use in the apparatus of FIG. 1.

A detailed description of the form of a nozzle assembly 34 will now be described with reference to FIG. 5, in which the nozzle assembly 34 is shown in sectional view. The assembly 34 comprises a first fluid conduit 72 which extends upwardly and defines a fluid inlet port 74. A lower end of the first conduit is secured to the angled discharge pipe 54. The first fluid port 74 permits produced water in the annular region 24 (see FIG. 1) to flow into the first conduit 72 and thus into the discharge pipe 54. A flange 78 is secured to the first fluid conduit 72 and permits the nozzle assembly 34 to be secured to the partition 18 (see FIG. 1) separating the upper and lower chambers 14, 16.

The assembly 34 also comprises a second fluid conduit 80 which extends through the first fluid conduit 72. The second conduit 80 defines an upper fluid port 82 which opens into the header region 36 (see FIG. 1). A lower end of the second conduit 80 is open in the region of the discharge pipe 54.

Thus, in use, water flowing through the first fluid conduit 72 will cause gas to be entrained from the second fluid conduit 80 from the header region 36 and subsequently mixed within the discharge pipe 54, thus established a good distribution of gas bubbles within the water prior to being discharged through an outlet 84 into the lower chamber 16.

The height of the fluid port 74 of the first fluid conduit will dictate the head of fluid within the annular region 24 which is required for the nozzle assembly 34 to operate. This operational head may be varied and pre-selected by the provision of an extension pipe 86 of a required length secured or integrally formed with the first fluid conduit 72. The operational head of the nozzle assemblies 34 may be in the region of 400-500 mm, for example.

In one embodiment of aspects of the present invention, the operational head may be equivalent for all nozzle assemblies 34 provided within the apparatus. However, in alternative embodiments two or more nozzle assemblies 34 may be provided with different operational heads by arranging the respective fluid ports 74 at different heights. Accordingly, in this arrangement, if the fluid head or level within the annular region 24 of the upper chamber 14 begins to drop, for example as a result of a reduced flow rate through the inlet 26, the nozzle assemblies 34 will sequentially be rendered ineffective in accordance with the heights of the respective fluid ports 74 until the flow passing through the reduced number of operating nozzle assemblies 34 into the second chamber 16 matches the flow entering the annular region 24 from the inlet 26. This arrangement may therefore be utilised to maintain a preferred velocity range of the fluid being discharged through the outlets 84 of the discharge pipes 54 into the second fluid chamber 16. The preferred velocity range may be selected in accordance with the required flow within the second fluid chamber 16. For example, a range of fluid discharge velocities may be required to establish and maintain rotational flow within the lower chamber. The preferred velocity range may also be selected to maintain the proportion of gas entrained within the fluid and the mixing between them which occurs in the discharge pipe within preferred values.

Figure 6:
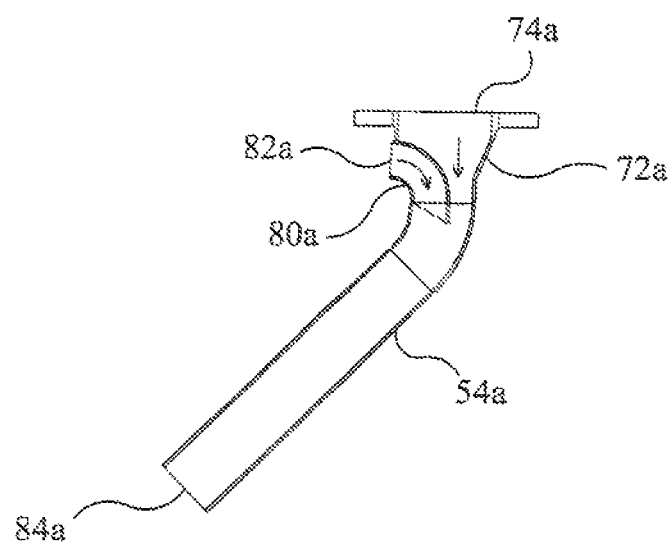
FIG. 6 is a cross-sectional view of a nozzle assembly according to an alternative embodiment of the present invention, which is suitable for use in the apparatus of FIG. 1.

An alternative embodiment of a nozzle assembly 34a which may be utilised in the apparatus 10 first shown in FIG. 1, is shown in FIG. 6, reference to which is now made. The assembly 34a of FIG. 6 is similar to the assembly 34 in FIG. 5 and as such like components share like reference numerals, followed by letter "a". As noted, nozzle assembly 34a is similar to assembly 34 and as such comprises a first fluid conduit 72a defining a fluid port 74a, and a second fluid conduit 80a defining a fluid port 82a. However, in this embodiment the fluid port 82a of the second fluid conduit 80a opens into a header region 90 (see FIG. 1) of the lower chamber 16. Thus, gas from the header region 90 may be entrained and mixed with produced water within a discharge pipe 54a prior to being discharged via an outlet 84a into the lower chamber 16. Although not illustrated, the nozzle assembly 34a may include an extension pipe, similar to pipe 86 of the example shown in FIG. 5.

Figure 7:
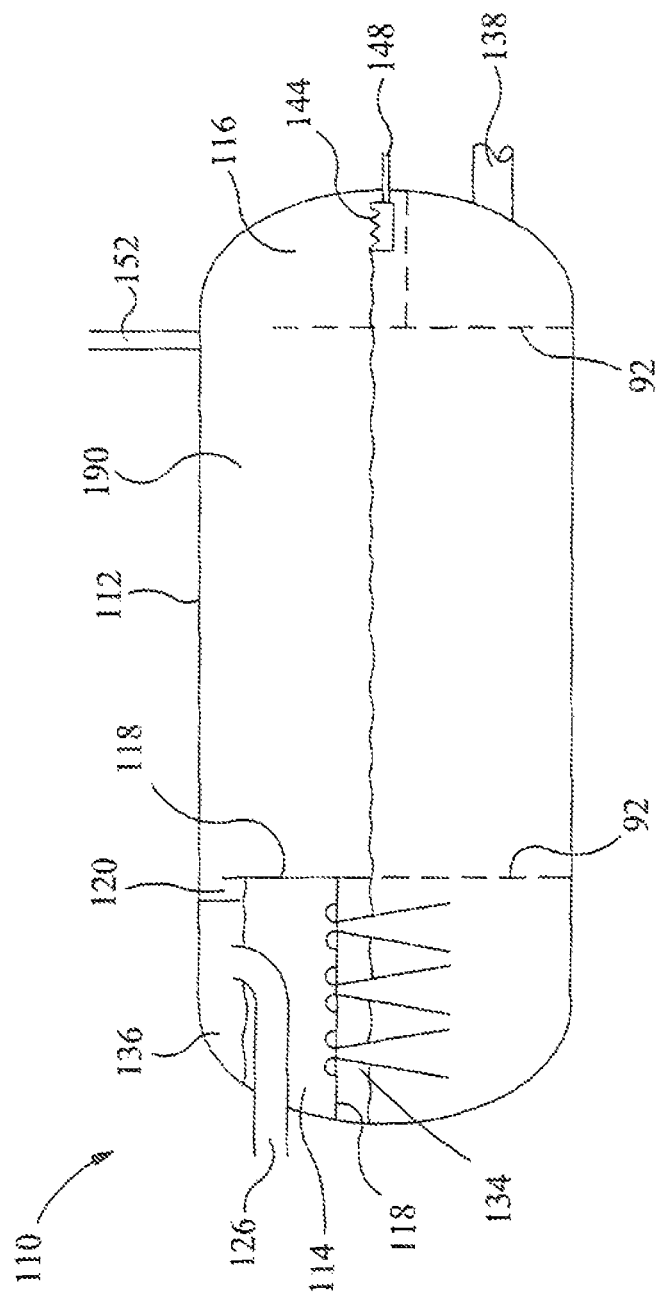
FIG. 7 is a diagrammatic representation of a fluid treatment apparatus in accordance with an alternative embodiment of the present invention.

A fluid treatment apparatus according to an alternative embodiment of the present invention will now be described with reference to FIG. 7. The fluid treatment apparatus, generally identified by reference numeral 110, is similar to the apparatus 10 first shown in FIG. 1 and as such like features share like reference numerals, incremented by 100.

The apparatus 110 therefore comprises a vessel 112, which in this case is horizontally arranged. First and second fluid chambers 114, 116 separated by a partition 118 are defined within the vessel 12. A fluid passage 120 is provided between the first and second chambers 114, 116 to permit passage of gas therebetween. A fluid inlet 126 communicates produced water into the first chamber 114, and a plurality of nozzle assemblies 134 are provided to permit communication of the produced water from the first chamber 114 and into the second chamber 116. The nozzle assemblies 134 facilitate entrainment of a gas within a header region 136 of the first chamber 114, or a header region 190 of the second chamber 116, into the produced water. This arrangement therefore provides a good mix and distribution of gas bubbles within the produced fluid prior to being discharged into the second chamber 116.

The produced fluid may then reside for a period of time within the second chamber 116 such that the gas and oil within the water may float to the surface thereof, while the water moves in a generally left-to-right direction. Perforated baffles 92, preferably at least two, are provided within the second chamber 116 to suppress backmixing of the water.

The treated water with significantly reduced gas and oil content may be discharged via a first outlet 138. The floating oil may be skimmed from the surface of the water by a skimming assembly 144 and subsequently discharged via a second outlet 148. The gas released from the water may be discharged via a third outlet 152.

It should be understood that the embodiments described herein are exemplary and that various modifications may be made thereto without departing from the scope of the present invention. For example, features of the present invention described above may be utilised in circumstances where the first and second chambers are provided in separate vessels. In this arrangement, the benefits of the present invention may still be achieved by virtue of passing the produced water to be treated through the nozzle assemblies such that a good mix and distribution of bubbles within the water is achieved before being discharged into the second fluid chamber for treatment. In other embodiments the first chamber may be dispensed with and fluid from a source may be directly supplied to at least one nozzle assembly to be discharged into a fluid treatment chamber.

Furthermore, in the embodiments described various conduits and passages are provided and located internally of the vessel. However, such conduits and passages may extend entirely or at least partially externally of the vessel.

Additionally, the apparatus may comprise a third fluid chamber adapted to receive fluid from the second fluid chamber for further treatment. Fluid communicated from the second fluid chamber into the third fluid chamber may be provided via at least one nozzle assembly.

Further, the gas to be entrained into the fluid being treated may be supplied from an external source.

The vessel may be opened to atmosphere.

Although the nozzle assemblies are arranged to entrain gas into the fluid being treated, in alternative arrangements at least one of the nozzle assemblies may be adapted to permit gas to be injected or otherwise delivered into the fluid being treated.

The invention claimed is:
1. A fluid treatment apparatus comprising:
a fluid vessel;
a partition secured to a side wall of the vessel to divide the vessel into first and second fluid chambers enclosed within the fluid vessel, the first fluid chamber being a header fluid chamber and the second fluid chamber being a flotation separation treatment fluid chamber;
a fluid inlet for delivering a fluid to be treated comprising a liquid into the first fluid chamber into engagement with said partition within the first fluid chamber, said fluid inlet having a smaller cross-section than the first fluid chamber; and
a plurality of nozzles for providing fluid communication of said fluid from the first fluid chamber to the second fluid chamber, wherein said nozzles are adapted to introduce gas into said fluid.

2. The fluid treatment apparatus according to claim 1, wherein the nozzles are adapted to extend through the partition.

3. The fluid treatment apparatus according to claim 1, wherein at least one nozzle includes a first fluid conduit defining a fluid port adapted to permit communication of fluid to be treated from the first fluid chamber into the first fluid conduit.

4. The fluid treatment apparatus according to claim 3, wherein the fluid port of the first fluid conduit is provided at a raised location relative to a base region of the first fluid chamber.

5. The fluid treatment apparatus according to claim 3, wherein at least one nozzle includes a second fluid conduit adapted to permit fluid communication of a gas from a gas source to a portion of the nozzle.

6. The fluid treatment apparatus according to claim 5, wherein the gas source comprises gas contained within the vessel.

7. The fluid treatment apparatus according to claim 5, wherein the gas source comprises gas released from the fluid being treated.

8. The fluid treatment apparatus according to claim 5, wherein the gas source comprises gas provided externally of the vessel.

9. The fluid treatment apparatus according to claim 1, wherein at least one nozzle includes a discharge pipe defining a fluid outlet opening into the second fluid chamber.

10. The fluid treatment apparatus according to claim 9, wherein the discharge pipe is arranged to establish rotational flow within the second fluid chamber.

11. The fluid treatment apparatus according to claim 1, wherein at least one of the nozzles is adapted to be operational at a different head of fluid within the first fluid chamber than at least one other of the nozzles.

12. The fluid treatment apparatus according to claim 1, further comprising a fluid passage between the first and second chambers to permit fluid communication therebetween.

13. The fluid treatment apparatus according to claim 12, wherein the fluid passage is adapted to permit fluid communication of a gas from the second fluid chamber into the first fluid chamber.

14. The fluid treatment apparatus according to claim 12, wherein the fluid passage extends through the partition separating the first and second chambers.

15. The fluid treatment apparatus according to claim 14, wherein the fluid passage is defined by a wall extending from a surface of the partition.

16. The fluid treatment apparatus according to claim 15, wherein the wall defines a wall portion of the first chamber.

17. The fluid treatment apparatus according to claim 1, further comprising a distributor assembly adapted to receive fluid entering the first chamber via the fluid inlet.

18. The fluid treatment apparatus according to claim 1, further comprising one or more fluid outlets to permit discharge of treated fluid or components thereof from the vessel.

19. The fluid treatment apparatus according to claim 1, wherein the second fluid chamber is adapted to receive fluid only from the first fluid chamber.

20. The fluid treatment apparatus according to claim 1, wherein communication of fluid being treated between the first and second fluid chambers is achieved exclusively through the nozzles.

21. The fluid treatment apparatus according to chamber claim 1, wherein at least one nozzle extends within the vessel from the first fluid to the second fluid chamber.

22. The fluid treatment apparatus according to claim 1, wherein at least one nozzle extends entirely within the vessel.

23. The fluid treatment apparatus according to claim 1, wherein said nozzles are adapted to facilitate mixing of gas from the first fluid chamber with said fluid to be treated.

24. The fluid treatment apparatus according to claim 1, wherein the plurality of nozzles extends entirely within the vessel.

25. A method of treating a fluid, said method comprising the steps of:
   discharging a fluid to be treated from a fluid inlet into a first fluid chamber, said fluid to be treated comprising a liquid and said fluid inlet having a cross-section that is smaller than said first fluid chamber;
   building up a head of fluid in said first fluid chamber;
   flowing the fluid through a plurality of nozzles adapted to introduce gas to said fluid; and
   discharging the fluid from the plurality of nozzles into a second fluid chamber to be further treated therein by flotation separation treatment, said first and second fluid chambers being separated by a partition secured to a side wall of said vessel for dividing said vessel into said first and second fluid chambers enclosed within said vessel, fluid being discharged into engagement with said partition within said first chamber.

26. The method of treating a fluid according to claim 25, the method comprising flowing the fluid through the nozzles wherein said nozzles are adapted to facilitate mixing of a gas from the first fluid chamber with said fluid to be treated.

27. A nozzle arrangement for distributing a fluid to be treated between a first fluid chamber and a second fluid chamber, said nozzle arrangement comprising:
   a first nozzle assembly comprising a first fluid conduit extending between the first and second fluid chambers, wherein the first fluid conduit comprises a first fluid port providing communication for said fluid with the first fluid chamber; and
   a second nozzle assembly comprising a second fluid conduit extending between the first and second fluid chambers, wherein the second fluid conduit comprises a second fluid port providing communication for said fluid with the first fluid chamber;
   wherein the first and second fluid ports are provided at different heights relative to a base of the first fluid chamber to facilitate operation of the first and second nozzle assemblies with different head ranges of fluid within said first fluid chamber to permit the nozzle arrangement to be operational only when a predefined head of fluid to be treated is present in the first fluid chamber.

28. A fluid treatment apparatus comprising:
   a fluid vessel;
   first and second fluid chambers defined within the fluid vessel;
   a fluid inlet for delivering a fluid to be treated into the first fluid chamber, said fluid to be treated comprising a liquid;
   at least one nozzle assembly for providing fluid communication of said fluid between the first and second fluid chambers, said nozzle assembly being adapted to facilitate mixing of a gas with said fluid, wherein said nozzle assembly comprises a discharge pipe defining a fluid outlet opening into the second fluid chamber and the discharge pipe is arranged to establish rotational flow within the second chamber; and
   a fluid passage between the first and second chambers to permit fluid communication of a gas from the second fluid chamber into the first fluid chamber.

29. The fluid treatment apparatus according to claim 28 further comprising a partition for separating the first and second fluid chambers, the fluid inlet delivering the fluid into engagement with the partition within the first chamber.

* * * * *